United States Patent
Fortin et al.

[15] 3,635,612
[45] Jan. 18, 1972

[54] MOLDING MACHINE

[72] Inventors: Michael J. Fortin, Stouffville; Joseph T. Latchford, Toronto; Marinus T. Vanden Heuvel, King City, all of Ontario, Canada

[73] Assignee: Fortin-Latchford Limited, Ontario, Canada

[22] Filed: Nov. 19, 1969

[21] Appl. No.: 878,004

[30] Foreign Application Priority Data

Oct. 29, 1969 Canada ............. 53008

[52] U.S. Cl. .............. 425/60, 425/243, 425/246, 425/247, 425/250
[51] Int. Cl. ......................................... B29c 3/02
[58] Field of Search .......... 18/5 RR, 1 C, 4 B, 4 PG, 41, 18/12 OR, 20-20 C, 20 H, 21

[56] References Cited

UNITED STATES PATENTS

| | | | |
|---|---|---|---|
| 2,027,915 | 1/1936 | Kux | 18/20 R |
| 2,218,456 | 10/1940 | Soubier et al. | 18/5 RR |
| 2,471,139 | 5/1949 | Benander et al. | 18/5 RR |
| 2,699,574 | 1/1955 | Gilbert | 18/5 RR X |
| 2,973,555 | 3/1961 | Schwepke | 18/20 T |

*Primary Examiner*—Robert L. Spicer, Jr.
*Attorney*—Rogers, Bereskin & Parr

[57] ABSTRACT

An automatic molding machine primarily for encapsulating small components. The molding machine consists of a wheel mounted for rotation, and a plurality of radially attached molding stations coupled to the wheel adjacent its periphery. Each station includes a mold cavity defined by inner and outer mold halves, and a radial cam follower cooperates with a fixed mold cam to move the inner mold half between open and closed positions. An injector piston is reciprocally journaled inside a tube in the mold cam follower. A charge of molding material is heated in the tube and upon closing the mold, a radial injector cam follower and fixed injector cam cooperate to move the piston radially outwards to inject the charge into the mold cavity. The stations are services as the wheel rotates by a parts feeder, a material feeder, and a parts stripper. The mold is heated by a hot oil system and a vacuum system evacuates the mold cavity as injection commences.

19 Claims, 8 Drawing Figures

INVENTORS
MICHAEL J. FORTIN
JOSEPH T. LATCHFORD
MARINUS T. VANDENHEUVEL

BY Rogers, Bereskin, & Parr

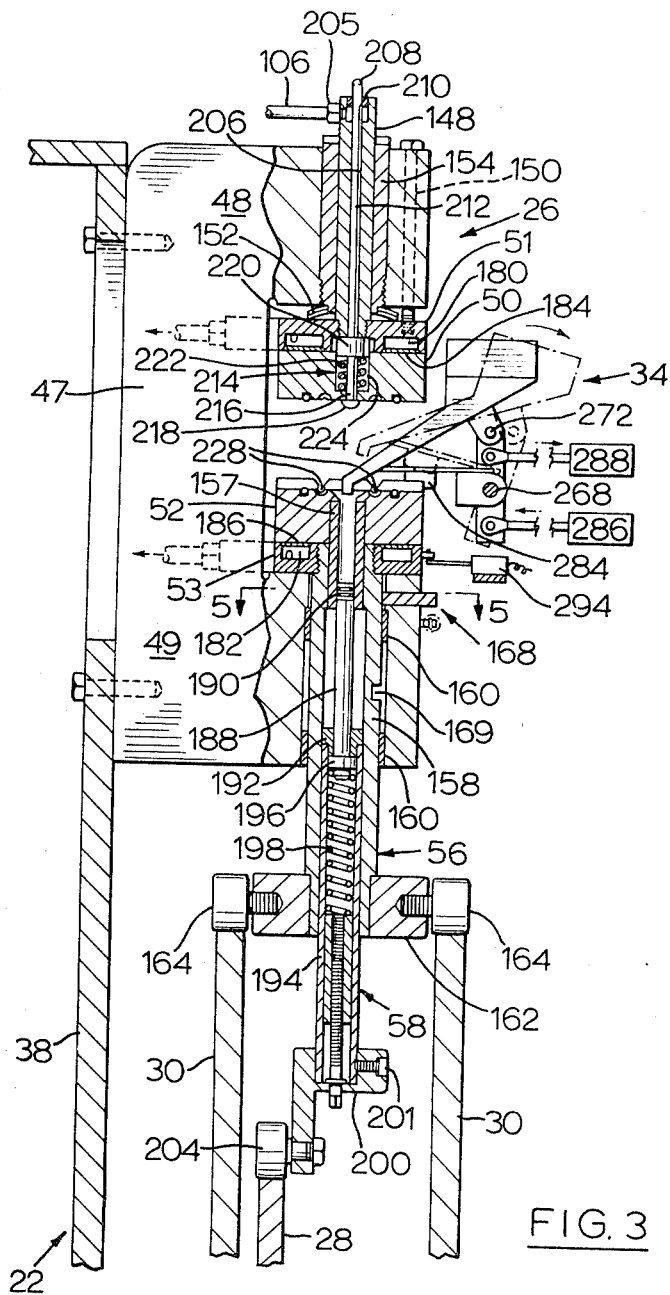
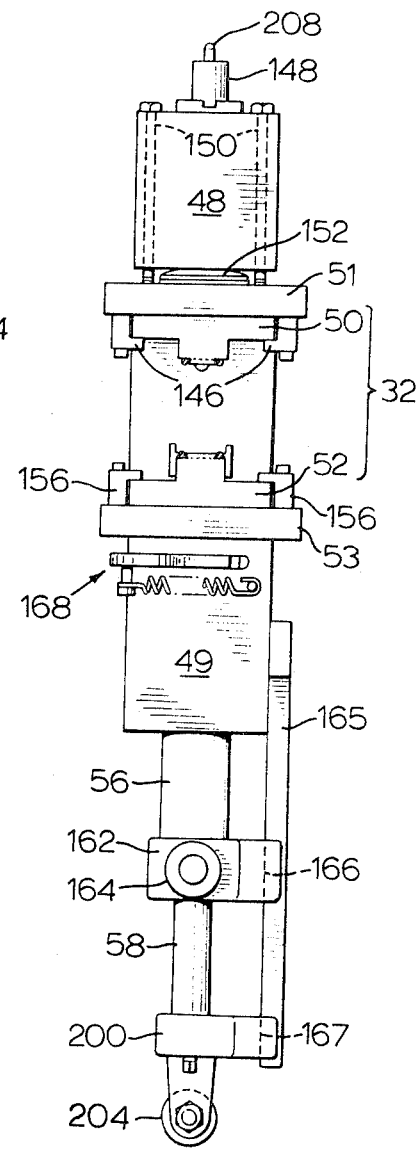
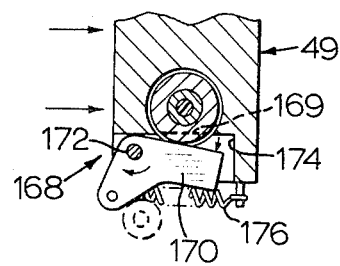
FIG. 3
FIG. 4
FIG. 5
INVENTORS
MICHAEL J. FORTIN
JOSEPH T. LATCHFORD
MARINUS T. VANDENHEUVEL
BY Rogers, Bereskin, & Parr

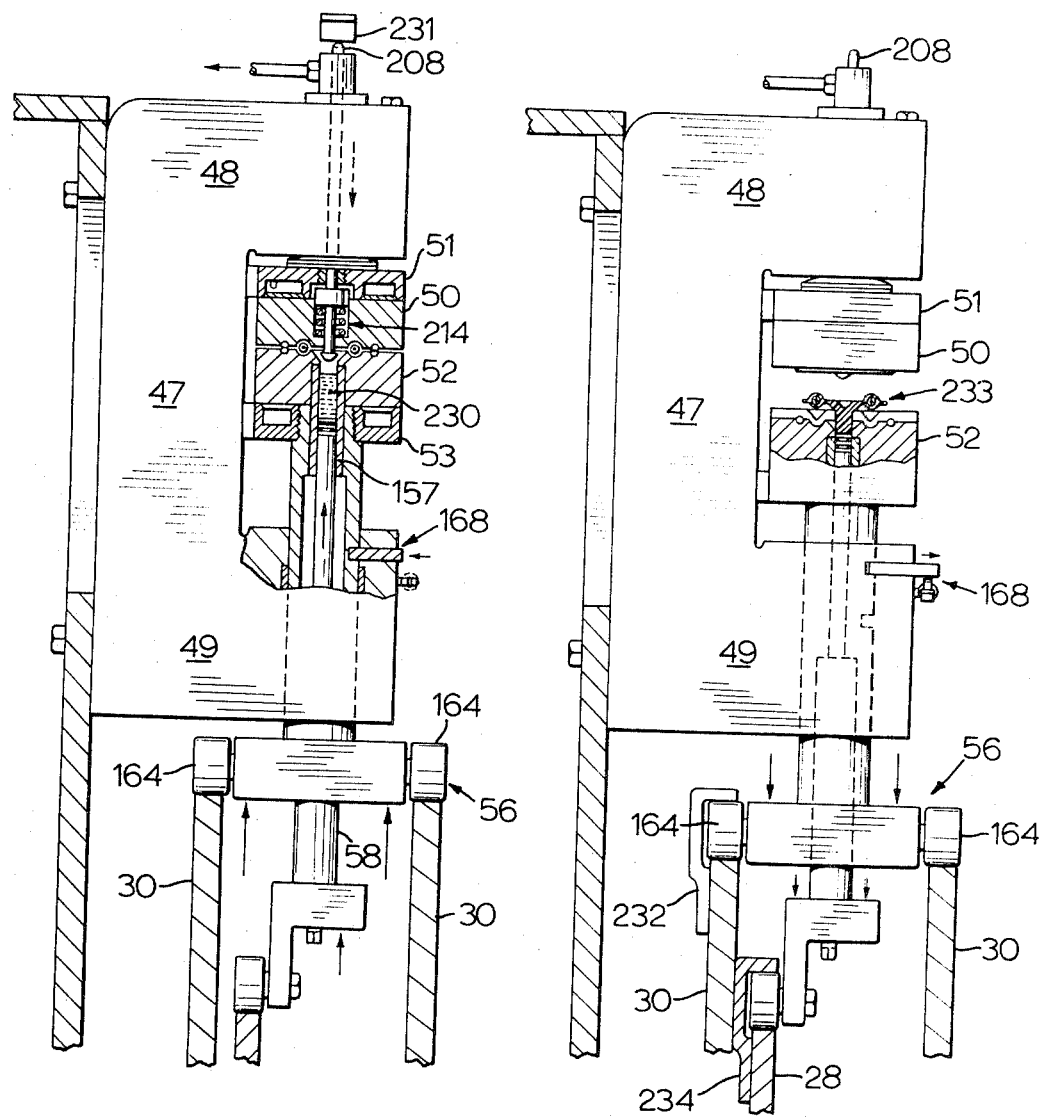

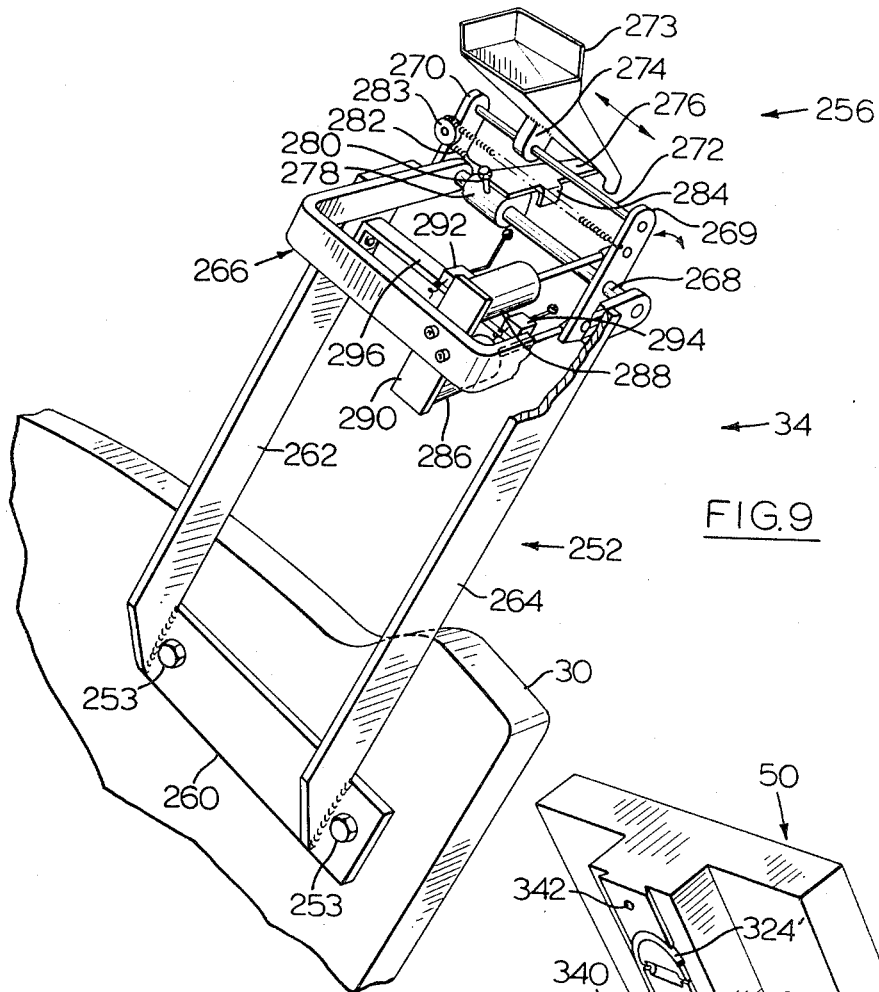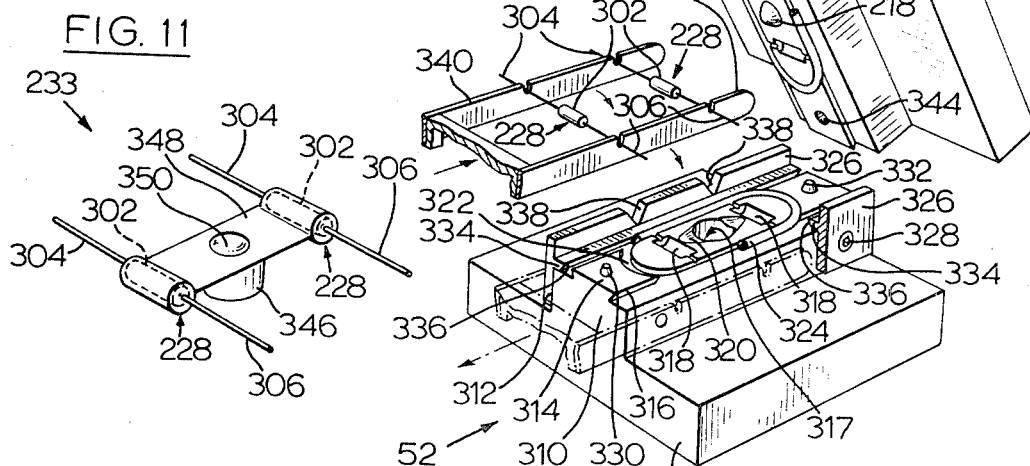

MOLDING MACHINE

This invention relates to automatic molding machines for molding small components, and more particularly it relates to automatic molding machines suitable for encapsulating small articles such as electrical resistors and the like.

Molding machines have been designed which consist essentially of a plurality of similar molding stations arranged vertically about the periphery of a horizontal wheel. Each station has a mold, and the mold is opened and closed automatically by a vertical cam follower which follows the contour of a horizontal profile cam. A charge of molding material is injected into the open mold, the mold is then closed and an electric heating element melts the charge. The molten charge is then injected into the mold cavity to take the shape of a finished product and the mold remains closed while the product is cured. Finally the mold is opened and the product is ejected from the mold.

The horizontal wheel and vertical stations makes it necessary to have a relatively strong machine structure because the vertical actions of the cam followers produce vertical reactive forces at the rim of the wheel and at the cam profile which tend to bend the wheel and cam. The diameters of the wheel and cam are determined mainly by the number of stations required, and consequently a typical machine having 24 stations is quite large and the wheel and cam must be designed to withstand substantial bending forces. A further disadvantage of the horizontal wheel is that it covers a relatively large floor area and the stations cannot all be seen at once from any given standpoint. When a number of machines are in use, an operator is required to be continuously moving about the machines in order to inspect their operation.

Accordingly, the present invention in one of its aspects provides a molding machine having a wheel mounted on a support structure for rotation about a longitudinal axis. The wheel has a plurality of similar radially mounted molding stations attached to its periphery. Each of the molding stations has a mold which comprises two mold members, and means connecting the mold members for movement of at least one of the mold members towards and away from the other of the mold members. The machine includes a cam which is fixed to the support structure in a plane parallel to that of the wheel, for combining with radial cam followers to move the molds between open and closed positions. As the wheel rotates, the forces exerted by the radial followers produce mainly tensile hoop stresses in the cam and in the wheel. In a preferred embodiment the wheel rotates in a vertical plane and the stations are preferably serviced continuously as the wheel rotates by: a parts feeder, which automatically places parts in the mold for encapsulation; a feeder for automatically feeding molding material into the mold; and a stripper which automatically removes finished parts to prepare the machine for a new cycle of operation. The molding stations are preferably heated by a hot oil system which provides a substantially uniform heat to all of the stations to liquefy the molding material.

The vertical wheel permits an operator to stand in front of the machine and inspect all of the stations simultaneously. Also a number of machines can be arranged in two rows with the machines in face-to-face relation so that the operator can inspect all of the machines by simply walking between the two rows.

These and other aspects of the invention will be more readily understood with reference to the drawings, wherein:

FIG. 3 is a sectional side view taken through the center of a station showing a mold about to be charged with molding powder;

FIG. 4 is a front view of the station;

FIG. 5 is a sectional view on line 5—5 of FIG. 3;

FIG. 6 is a view similar to FIG. 3 showing the station just after the mold has begun to open;

FIG. 7 is a view similar to FIG. 6 showing the station with the mold almost fully open;

FIG. 9 is a perspective view of a powder feeder;

FIG. 10 is a perspective view of the mold and a portion of a parts feeder; and

FIG. 11 is a perspective view of a finished product.

Figure 1:
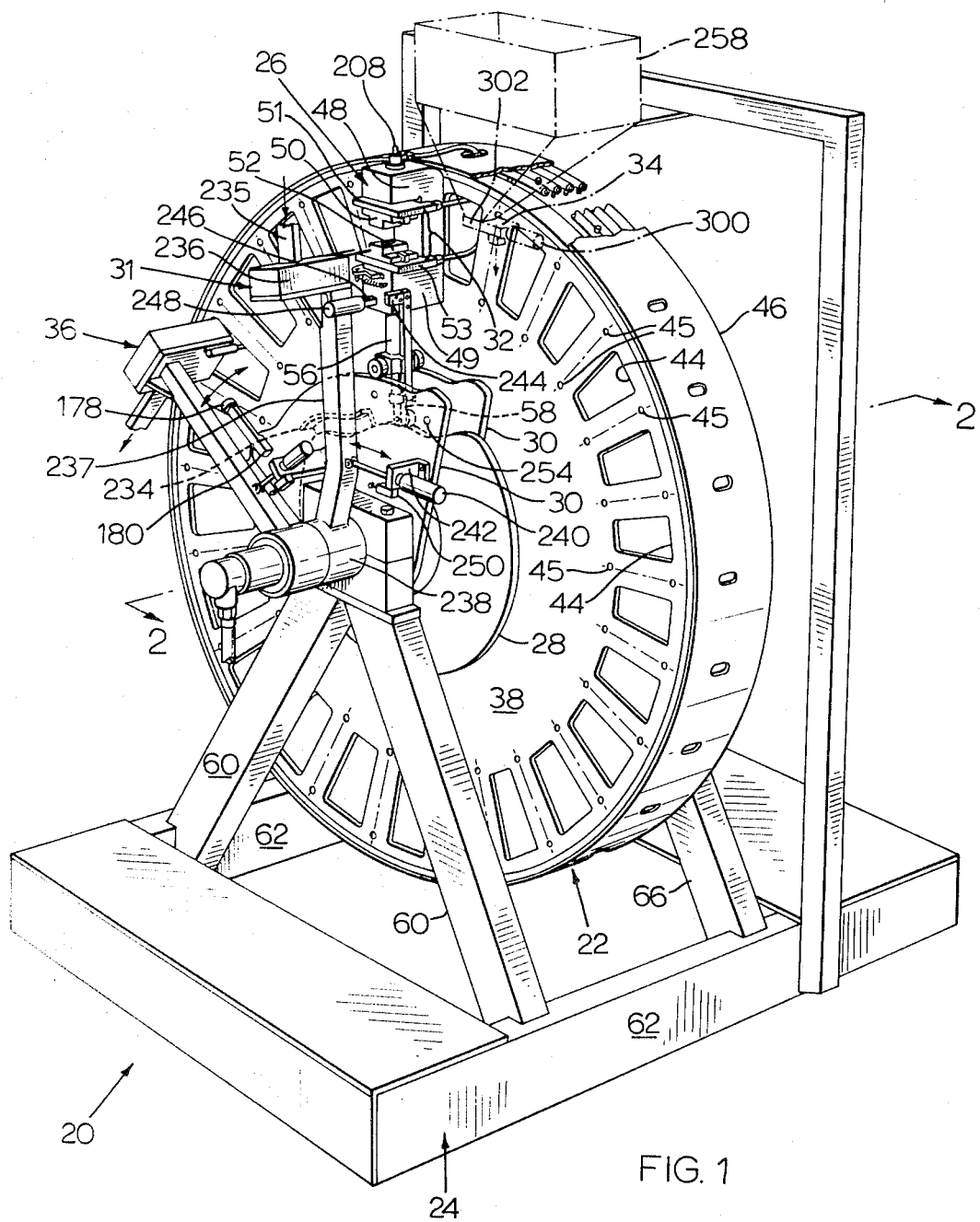
FIG. 1 is a perspective view of a machine according to the invention.

Reference is first made to FIG. 1 which illustrates a molding machine 20 for encapsulating small components. The machine 20 comprises a wheel 22 which is rotatably mounted in a vertical plane on a frame 24. The wheel 22 carries a plurality of rigidly attached molding stations 26 (one of which is shown), through a cycle of operations which are controlled mainly by a stationary injector cam 28 and a pair of similar mold closing cams 30 attached in spaced relation about the cam 28. As the wheel 22 rotates through a cycle, each station 26 first passes a parts feeder 31 which moves with the station while two similar parts are transferred to the molding station 26 where they rest on the lower half of a mold 32. Next the station moves with a powder feeder 34 (part of which is shown) which delivers a measured charge of molding material into a recess in a lower half of the mold 32. The material is preferably a powder but may be a liquid or fine chips. In most cases however, the material will be a powdered thermosetting plastic. After the charge is heated and liquefied in the recess, the cams 30 close the mold 32 and then the injector cam 28 injects the charge into the mold to encapsulate the parts, thereby forming a finished product. The wheel continues to rotate while the product is cured until the station 26 reaches a parts stripper 36 which removes the product and prepares the station 26 for a new cycle.

Figure 2:
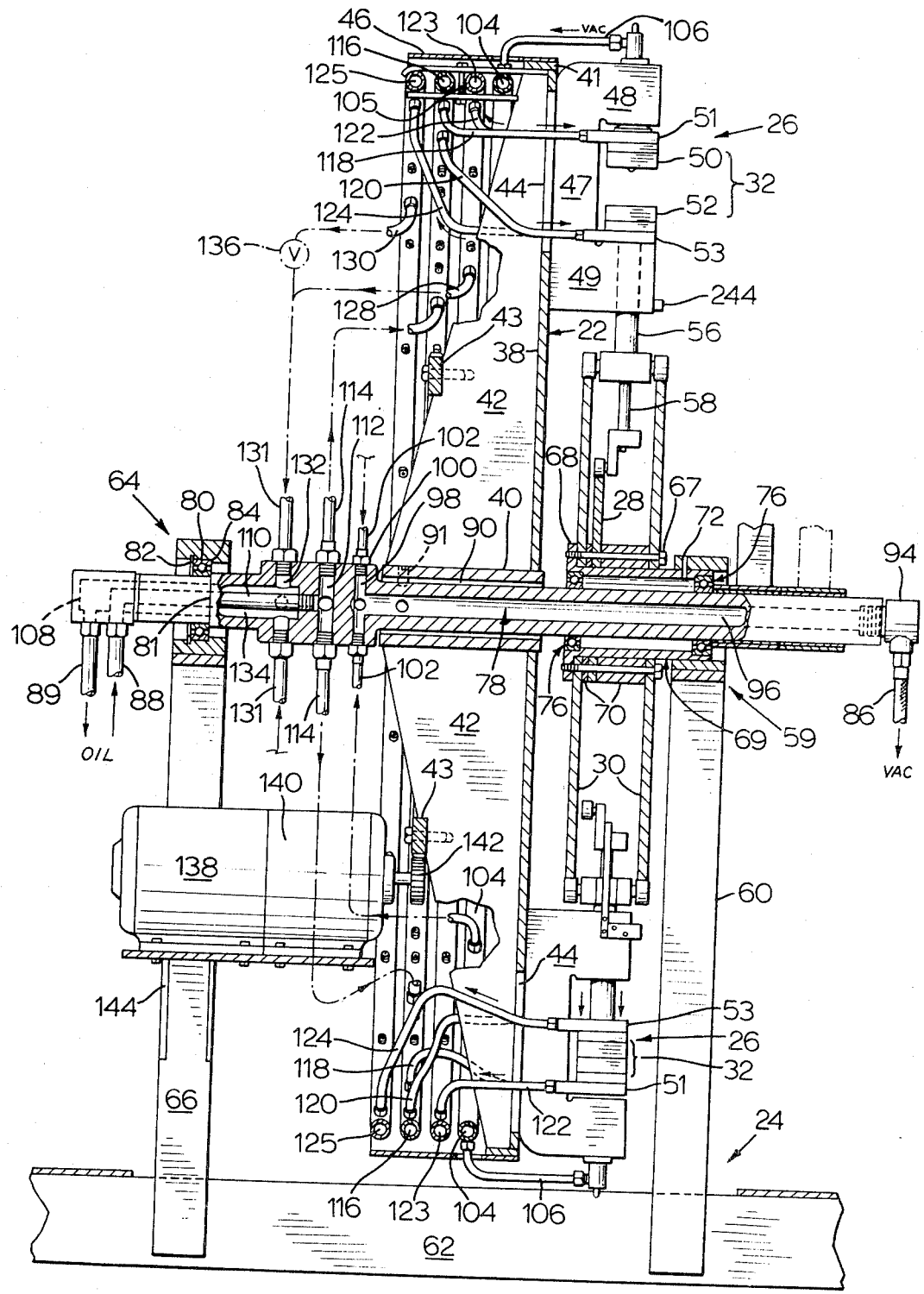
FIG. 2 is a sectional side view on line 2—2 of FIG. 1.

Reference is now made to FIGS. 1 and 2. The wheel 22 comprises a circular front plate 38 which is welded to the front end of a tubular hub 40 (FIG. 2) and has a rearwardly extending rim 41 (FIG. 2) welded to its outer edge. A plurality of rigidifying webs 42 (preferably at least eight) (FIG. 2) are welded to the hub 40, the back face of the front plate 38, and the inner face of the rim 41. The webs 42 rigidify the wheel 22 and support a ring gear 43 (FIG. 2) for driving the wheel 22. The front plate 38 also has a plurality of equiangularly spaced oil pipe apertures 44 corresponding to the number of stations 26. Each of the stations 26 is connected to the wheel front plate 38 between two apertures 44 by two bolts (not shown) which pass through bolt holes 45 (FIG. 1) in the front plate 38 of the wheel 22, and the station oil pipes (described below) pass from behind the wheel through the oil pipe apertures 44 to the stations 26. The wheel is completed by a cylindrical cover 46 which is attached at its front end to the outer face of the rim 41 by any suitable conventional fastener. The cover 46 protects the pipes (to be described) and is preferably easily removable for maintenance.

The wheel 22 carries 24 stations 26, each of which comprises a generally C-shaped main body having a rear portion 47 (FIG. 2) by which the body is attached to the wheel 22, and forwardly extending outer and inner portions 48, 49 respectively. An outer half 50 of the mold 32 is attached to an outer oil platen 51 (for heating the molding powder) which is slidably connected to the outer portion 48 of the main body 46. An inner half 52 of the mold 32 is attached to an inner oil platen 53 which is slidably connected to the inner portion 49 of the body 46 and is coupled to the mold closing cams 30 by a radial cam follower 56. The molding station 26 is also coupled to an injector cam follower 58 which extends radially inwardly from the station 26 to contact the periphery of the injector cam 28. The internal features of the station 26 and cam followers 56 and 58 will be more fully described with reference to FIG. 3.

Reference is again made to FIG. 2 which shows the structure associated with mounting the wheel 22 and the frame 24. A front housing 59 on the main frame 24 is supported on two equally inclined legs 60 (FIG. 1) which extend upwardly and inwardly from longitudinal side members 62, and a rear housing 64 is supported on legs 66 which also extend upwardly from the side members 62. The full weight of all the machine parts which are not attached to the frame directly is transmitted through the housings 59 and 64 to the frame 24.

The cams 28, 30 are rigidly attached by fitted bolts 67 to a collar 68 which is an integral part of a bearing sleeve 69. A pair of unequal length cam spacer sleeves 70 are slidably engaged on the bearing sleeve 69 between the cams 28 and 30 to position the cams for the cam followers 58 and 56 respectively. The sleeve 69 is supported in the housing 59 and is held in place by a locking pin 72 set in both the sleeve 69 and the housing 59. The locking pin 72 is designed to shear should there be an obstruction between the wheel and the cams so that the cams will then move with the wheel to minimize the possibility of damage to the machine. The sleeve 69 is recessed at its ends to house two conventional ball bearings 76 for rotatably attaching the front portion of a shaft 78. The shaft 78 is also rotatably mounted near its rear end in a ball bearing 80 which is a force fit on the shaft 78 and locates against a shoulder 81 on the shaft. The bearing 80, and hence the shaft 78, is located relative to the frame 24 by an internal circlip 82 and a shoulder 84 in the housing 64. In the event that the shear pin 72 should break, the rotating parts cannot move axially relative to the frame housings because the bearing 80 is positively located in the housing 64.

The shaft 78 has several functions. Firstly, it supports the machine wheel 22. Secondly, the shaft 78 distributes a vacuum supply from a vacuum source 86 at the front of the machine to the stations 26 as described later. Thirdly, the shaft 78 distributes heating oil from a supply pipe 88 at the rear of the machine and collects the return oil which leaves by a return pipe 89 situated next to the supply pipe 88.

The wheel 22 has an axial bore which is lined with a ceramic liner 90 to reduce heat losses from the shaft 78 which is heated by the oil. The wheel 22 and liner 90 are locked to the shaft 78 by locking screws 91.

The vacuum supply is coupled to the shaft 78 by a rotary union 94 which is screwed into the front end of shaft 78. The rotary union 94 connects the stationary vacuum supply pipe 86 to the rotating shaft 78 which has an elongated axial aperture 96 extending from the front end to four radial distribution outlets 98 (three of which are shown). The outlets 98 have conventional connectors 100 and pipes 102 (partially shown) connected to them for distributing the vacuum supply to a vacuum manifold 104 which is supported on the wheel 22 by clamps 105. The vacuum manifold 104 has pipes 106 connecting it to the top of each station 26. The function of the station vacuum supply will be described with reference to the machine cycle shown in FIG. 8.

The oil supply is connected to the rear end of the shaft 78 by a conventional inlet/outlet rotary union 108 which receives hot oil from the oil inlet pipe 88 and returns cooled oil to the oil outlet pipe 89. The inlet oil passes from the inlet pipe 88, down a central rotary union pipe 110 to four radial distribution apertures 112 (three of which are shown) which feed the oil through pipes 114 (parts of which are shown) to an oil inlet manifold 116 on the wheel 22. The oil inlet manifold 116 is connected to the stations 26 by pipes 118, 120 which lead to each of the station mold platens 51 and 53 respectively. The pipe 120 is flexible to allow opening and closing of the mold 32. Oil which leaves the outer platens 51 enters pipes 122 which lead to a first oil outlet manifold 123, and oil which leaves the inner platens 54 enters flexible pipes 124 which lead to a second oil outlet manifold 125. The outlet manifolds 123 and 125 feed oil to pipe 128 and 130 respectively which join (shown in chain-dotted outline) into pipes 131 which enter four radial shaft apertures 132 (two of which are shown). The apertures 132 are connected to the rotary union 108 by an annular passage 134. The oil pipe 130 which leads from the outlet manifold 125 may include valves 136 to balance the oil flow through the station platens 51 and 53 to give a measure of adjustment of the relative heat exchanged in the station platens.

It will be evident from FIG. 2 that the wheel 22, manifolds, piping and shaft 78 form a unit which rotates in the bearings 76 and 80. The unit is driven by an electric motor 138 through a transmission 140 which has a pinion 142 in mesh with the ring gear 43 mounted on the back of the wheel 22. The motor and transmission are mounted on a bracket 144 on the frame leg 66.

Reference is now made to FIG. 3 which illustrates one of the stations 26 and its internal parts with the mold 32 open.

The outer half 50 of the mold 32 is clamped to the outer oil platen 51 by conventional machine clamps 146 (FIG. 4) and the outer oil platen 51 is threadably attached to the inner end of a sleeve 148 and to the threaded ends of a pair of fitted guide bolts 150, (FIG. 4). The bolts 150 are slidably engaged in the outer portion 48 of the main body to hold the outer platen 51 against a cup spring 152 and to prevent rotation of the outer platen 51 and sleeve 148. The platen sleeve 148 is slidably engaged in a bearing sleeve 154 which is threaded at its inner end for locking it into the outer portion 48. When the mold halves 50 and 52 are closed, the outer mold half 50 and platen 51 will move outwardly slightly thereby compressing the cup spring 152. Upon opening the mold 32 the spring 152 will return the platen 51 and mold half 50 to their original positions.

Reference is now made to the FIG. 3 inner mold half 52 and inner platen 53 to describe the station parts involved in moving the inner mold half 52 towards the outer mold half 50 to close the mold 32. The inner mold half 52 is held on the inner oil platen 53 by conventional machine clamps 156 (FIG. 4) and is located by an inwardly extending locating tube 157 which is a forced fit in the inner mold half 52. The inner platen 53 is threadably connected to the outer end of an inwardly extending guide tube 158 which is free to slide in journal bearings 160 and which slidably receives the mold locating tube 157. The inner end of the guide tube 158 is a forced fit in a cam follower roller carrier 162 which has a pair of rotatably attached cam follower rollers 164 for following the profile of the stationary mold closing cams 30. The cam followers 56 and 58 are restrained to move in linear paths by a guide bar 165 (FIG. 4) which is rigidly attached at its outer end to the inner portion 49 of the station 26. The cam followers 56 and 58 have slots 166 and 167 respectively for slidably engaging the guide bar 165.

The closing cams 30 have a peripheral cam contour such that as the station 26 moves with the wheel 22 about the closing cams 30, the inner mold half 52 and its associated parts move outwardly until the inner mold half 52 meets the outer mold half 50. The inner mold half 52 continues to move outwardly sufficiently to compress the outer mold half cup spring 152 at which point a spring-loaded latch 168 mounter in the inner portion 49 of the station 26 enters a slot 169 in the guide tube 158. The cam follower 56 can then be withdrawn to remove stress from the cams 30 since the latch 168 retains the mold halves 50 and 52 in contact under the action of the cup spring 152. The mold halves 50 and 52 will remain in contact until the latch 168 is unlocked, as will be described.

Reference is now made to FIG. 5 to describe the latch 168 more fully and to describe the action of the parts involved in closing and opening the mold 32. The latch 168 comprises a bellcrank lever 170 pivotally attached by a pivot pin 172 to the inner portion 49 of station 26 in a recess 174. The latch lever 170 is biassed by a spring 176 to move into a locking position where it is engaged in the guide tube slot 169 (shown in dotted outline). FIG. 5 illustrates the latch in the open position where it is resting on the cylindrical surface of the guide tube 158. As previously described with reference to FIG. 3, the mold cam follower 56 urges the inner mold half 52 outwardly until the latch lever 170 enters the guide tube slot 169. The latch 168 remains in the locked position until the station passes a latch release roller 178 (FIG. 1), rotatably attached to a bracket 180 on the front mold closing cam 30. The unlocking sequence begins when the mold cams 30 (FIG. 1) again meet the mold closing cam follower 56 (FIG. 1) and take the locking force exerted by the cup washer 152 off the latch 168. The latch lever 170 then meets the latch release roller 178 (FIG. 1) which moves the latch lever 170 into the unlocked position whereupon the mold closing cams 30 (FIG.

1) start to move the cam follower 56 (FIG. 1) and the inner mold half 52 (FIG. 1) away from the outer mold half 50 (FIG. 1) and back into the position shown in FIG. 3.

Reference is now made to FIG. 3 to describe the station parts associated with the oil heating system. As previously described with reference to FIG. 2 each of the oil heating platens 51 and 53 is supplied with hot oil by pipes 118 and 120 (FIG. 2) respectively and the oil leaves the platens by oil pipes 122 and 124. While in the platens 51 and 53, the oil passes through annular platen chambers 180 and 182 which are formed in the platens 51 and 53 and closed by cover plates 184 and 186 respectively. The platens 51, 53 are preferably made from stainless steel and the cover plates 184, 186 are a laminate of silver and copper with the silver in contact with the oil. This choice of materials helps to direct most of the heat transferred from the oil to the associated half of the mold rather than to other associated parts. The heat is provided to liquefy a molding powder charge which is placed in the inner mold locating tube 157 by the powder feeder 34, (part of which is shown). The molten charge is then injected into the mold 32 under the force applied by the injector cam follower 58 acting on the cam 28. Injection of the molding charge and ejection of the finished product will now be described, also with reference to FIG. 3.

The locating tube 157 which locates the inner mold 52 in the guide tube 158 receives the charge of molding powder from the powder feeder 32 (as will be described). The locating tube 157 is closed at its inner end by a piston 188 which has a Teflon tip 190 at its outer end to improve the seal. The piston 188 is in a charge-receiving position as shown in FIG. 3 when the molding powder charge is fed into the locating tube 157. When the piston 188 moves, it is guided by a bush 192 which is an interference fit in a piston sleeve 194. Also the inner end of the piston 188 is attached to a collar 196 which retains the piston in the bush 192 and also acts as a seat for the outer end of a heavy spring 198. The bush 192 and sleeve 194 are slidably engaged in the guide tube 158 of the mold closing cam follower 56 so that the cam followers 56 and 58 are free to move independently of each other. The inner end of the sleeve 194 is locked into a cam follower bracket 200 by a setscrew 201. When the machine is assembled, the tension in the spring 198 is adjusted to ensure an adequate injection force. This adjustment is provided by a conventional screw and nut adjuster 202 which is mounted in the inner end of the piston sleeve 194 and bears against the cam follower bracket 200. The follower bracket 200 has a rotatably attached roller 204 for following the peripheral profile of the injector cam 28. After the molding powder charge has been liquefied in the locating tube 157, and the mold 32 is closed, the rotational movement of the wheel 22 results in the stationary injector cam 28 moving the injector cam follower 58 outwardly. This outward movement is transmitted through the spring 198 to the piston 188 which forces the molten charge into the mold 32. This movement of the molten charge is referred to as "injection." The piston has then reached the limit of its outward travel due to the resistance presented by the molten charge and is then in an injection position. However, the injector cam 28 continues to move the injector cam follower 58 outwardly for a short distance while the injection piston 188 and its collar 196 remain stationary, so compressing the spring 198. A circular portion of the cam 28 holds the piston in this position during curing, and after curing the mold opens, as previously described, so that the energy stored in the spring 198 lifts the finished product off the lower mold half 52. This movement of the product by the piston is referred to as "ejection," and the piston is then in the ejection position.

The mold 32 is also served by the vacuum system supplied by the pipe 106 which enters the station at the outer side of the station. The pipe 106 is attached to the side of the exposed end of the sleeve 148 near the outer end of the sleeve 148 by a conventional pipe coupling 205. The sleeve 148 has an elongated cylindrical axial aperture 206 in which a vacuum valve push rod 208 is free to slide and which opens out at the push rod outer end into a recess for receiving a vacuum seal 210. The push rod 208 has a circular cross section at the seal 210 and a longitudinal flat portion 212 along the rest of its length for allowing the vacuum supply at the vacuum pipe 106 to draw air past the push rod 208. The push rod 208 acts on a spring-loaded vacuum valve assembly 214 which consists of a valve having a spindle 216 slidably mounted in the mold half 50 and a mushroom head 218 at the inner end of the spindle 216 for seating on the surface of the mold 50. The valve spindle 216 is rigidly attached at its outer end to a spring retaining collar 220 for holding a spring 222 in compression in a recess 224. Both the valve spring 216 and the spring retaining collar 220 have flat portions along their complete axial lengths so that when the push rod opens the vacuum valve, the vacuum supply can draw air from the mold past the spindle 218, then around the collar 220 and outwardly past the push rod 208 to the vacuum pipe 106. The timing of the opening and closing of the vacuum valve 214 will be explained later in the description.

This completes the description of the parts which form the station 26. Reference is now made to FIGS. 1, 3, 6, 7 and 8 to describe a preferred machine cycle. The cycle is considered to begin at "s" (FIG. 8) for convenience, and moves clockwise as drawn.

At the beginning of the cycle the station 26 is in the position shown in FIG. 3. The parts feeder 31 shown diagrammatically in FIG. 1, places the parts to be encapsulated 228 (FIG. 3) in the inner mold half 52. A control for a preferred parts feeder 31 (FIG. 1) will be described later. A step in the cycle labeled "parts feed" (FIG. 11) is now complete and the next step is the "powder feed" which is carried out automatically by the powder feeder 34 which will be fully described with reference to FIG. 9. The powder feeder 34 places a molding powder charge 230 (FIG. 6) in the inner mold half locating tube 157 where it begins to liquefy due to the heat from the oil supply. The inner mold half 52 (FIG. 3) is then moved by the mold closing cams 30 (FIG. 3) (as previously described) and the latch 168 (FIG. 3) locks the mold 32 in the closed position. The cycle has now reached the point where "injection" is about to begin (FIG. 8) under the action of the injector cam 28 (FIG. 3) as previously described.

Reference is now made to FIG. 6. As injection begins the station 26 reaches an actuator bracket 231 (FIG. 6) which is rigidly fixed to any convenient upper part of the frame 24 (FIG. 1) for operating the vacuum valve push rod 208. When the bracket 231 opens the vacuum valve 214, the vacuum supply draws air from the mold just after injection begins. The bracket 231 then allows the valve 214 to close before injection is completed (FIG. 8) so that none of the charge enters the valve 214. The combination of a vacuum and pressure injection helps to give a molding which is substantially free of bubbles and irregularities. At the end of injection, the "curing" period begins and this period takes up approximately three-quarters of the cycle. Towards the end of the curing period, the mold closing cam follower 56 (FIG. 6) is lifted slightly by the mold closing cams 30 to allow the latch 168 to be unlocked. Next, a collector plate 232 (FIG. 7 and 8) on the rear mold closing cam 30 begins to guide the cam follower rollers 164 inwardly to open the mold 32 thereby allowing the injector piston spring 198 to push the finished product 233 (FIG. 7) off the inner mold half 52. Almost immediately after the mold begins to open, a collector plate 234 (FIGS. 7 and 8) on the injector cam 28 begins to withdraw the injector cam follower 58. The station 26 is now as shown in FIG. 7. When the mold is fully open, the parts stripper 36 FIG. 1 removes the finished product from the lower mold half 52 and an air blast cleans the mold halves 50. 52 followed by a lubricating spray which may be sprayed on the mold periodically. A control for the parts stripper will be described later. The cycle is now complete and the station is ready to begin a new cycle.

The cycle is preferably continuous so that as the wheel 22 rotates, each station 26 cooperates firstly with the parts feeder 31, then with the powder feeder 34, and lastly with the parts stripper 36. However the order of events may be changed if required. For instance in some applications it is preferable to place the molding material in the mold before placing the parts in the mold. The mold can then be closed as soon as the parts are in place to reduce the risk of dislodging the parts during the introduction of molding powder.

A further refinement to the mold closing mechanism can be provided by adding a return spring to bias the mold halves together. The collector plate 232 is extended to maintain the mold open against the return spring until such time as the mold is recharged and ready to be closed. The plate 232 is shaped so that the mold closes under the action of the return spring and final closing is completed by the cams 30 and cam follower 56.

Figure 8:
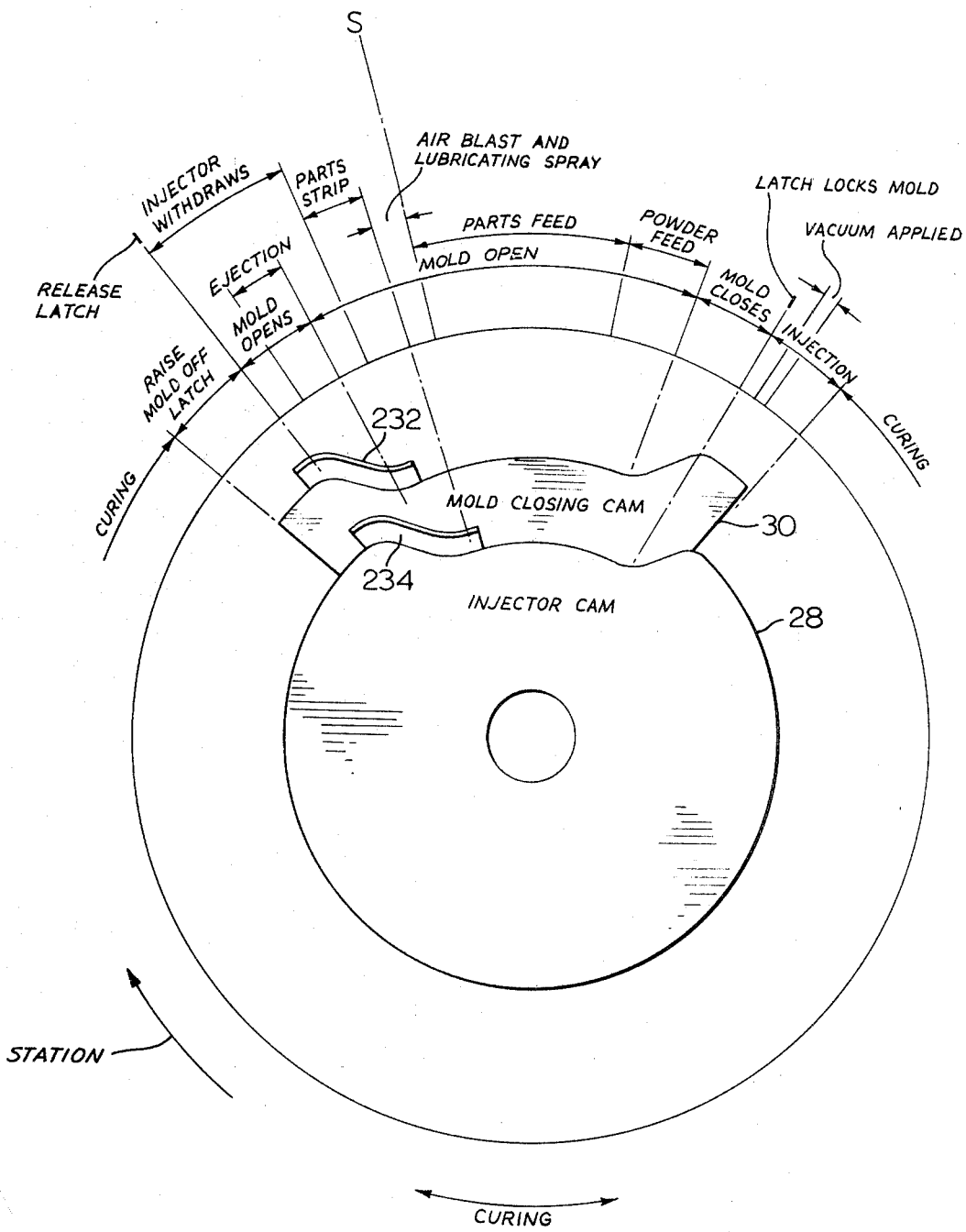
FIG. 8 is a diagram showing a cycle of a machine operation.

Reference is now made to FIG. 1 to describe the automatic action of the parts feeder 31, which receives parts down a chute 235. The feeder 31 has a feeder head 236 which is attached to the distal end of a support arm 237 and the arm 237 is attached at its opposite end to a sleeve 238. The sleeve 238 is rotatably mounted on the machine shaft 78 (FIG. 2) to allow the arm 236 to move with the wheel 22 from a rest position to a displaced position during the portion of the cycle labeled "parts feed" (FIG. 8). The arm 237 is attached near its longitudinal midpoint to a spring-loaded dashpot 240 which is rigidly attached to the front cam 30 by a bracket 242. The dashpot 240 biases the parts feeder arm in an anticlockwise direction as drawn in FIG. 1. As the wheel 22 rotates, the station 26 passes beside the parts feeder 31 until a station stop 244 on the inner portion 49 of the station main body meets a plunger 246 of solenoid 248 which is normally in an engagement position. The solenoid is attached to the parts feeder 31. The parts feeder 31 then moves with the station 26 while the feeder 31 supplies the required parts to the station mold 32. When the arm 237 connects with an electrical contact 250 which is mounted below the dashpot 240, the contact 250 activates the solenoid 248 and withdraws the solenoid plunger 246 into a release position thereby freeing the parts feeder 31 from the station stop 244. The parts feeder 31 then returns to its original position under the action of the spring-loaded dashpot 240.

A control system for the parts stripper 36 is provided, and this system is similar to the above parts feeder control system. It will be evident from FIG. 1 that both control systems operate in exactly the same manner.

The powder feeder 34 is also designed for a continuous cycle and reference is now made to FIG. 9 which shows a preferred powder feeder 34 in detail. The powder feeder 34 comprises a framework 252 which is rigidly attached by bolts 253 to the front closing cam 30 at cam bolt holes 254 (FIG. 1) and which extends radially outwardly from the closing cam 30 to support a funnel assembly 256 which is adapted to receive molding powder from a powder feeder hopper 258 (FIG. 1) fixed to the upper part of the machine framework 24.

The powder feeder framework 252 comprises an attachment bracket 260 for attaching the feeder framework 252 to the cam 30. The attachment bracket 260 supports two parallel elongated arms 262 and 264 which extend outwardly to rigidly support a U-shaped control support member 266 which opens out towards the machine wheel 22 (FIG. 1). The U-shaped member 266 has a shaft 268 rotatably mounted near its ends for supporting parts which locate the position of the funnel assembly 256. These location parts include a pair of parallel bars 269 and 270 which are rigidly attached to the shaft 268 and which are rigidly attached at their outer ends to a second shaft 272 which is parallel to the first shaft 268. The shafts 268 and 272 form a track for supporting the funnel assembly 256 which comprises the funnel 273 having an integrally attached inwardly extending projection 274 slidably mounted on the second shaft 272. The funnel 273 is also rigidly attached at a point below the funnel projection 274 to an end of an elongated plate 276 which is attached at its opposite end to a bush 278. The bush 278 is slidably mounted on the first shaft 268 and is attached by a pin 280 to one end of an elongated spring 282 which biases the funnel assembly 256 in a direction contrary to the movement of the wheel 22 (FIG. 1). The spring 282 passes over a pulley wheel 283 on the bar 270 and is attached at its opposite end to the other shaft 269. Thus the funnel assembly 256 can rotate about the axis of the shaft 268 and the funnel assembly 256 can slide on the shafts 268, 272 against the biassing force exerted by the spring 282. The assembly 256 is moved from a first position to a second position on the shafts 268, 272 by the station 26 (FIG. 1) when the leading edge of a lower mold half 52 (FIG. 1) engages an inwardly extending shoulder 284 on the plate 276. Rotation of the funnel assembly 256 about the axis of the shaft 268 is controlled by a pair of solenoids 286, 288 mounted one at each end of a radial bar 290 which is attached at its midpoint to the bight of the U-shaped member 266. The solenoid rods are pivotally attached to the bar 269 so that solenoid 286 rotates the funnel assembly 256 into a mold-charging position as shown in FIG. 3 and solenoid 288 moves the assembly 256 back to its normal or disengaged position (chain-dotted outline in FIG. 3). The solenoids 286, 288 are controlled by trip switches 292, 294 respectively, as will now be described. The trip switches are mounted on a bracket 296 which is attached to the side of the arm 262 near its outer end such that the bracket extends towards the arm 264 and lies parallel with the shafts 268, 272.

The complete operation of the powder feeder 34 is as follows, with reference to FIGS. 3 and 9. Firstly, a leading portion of the inner mold half 52 (FIG. 3) meets the first feeder trip switch 292 which then activates the funnel lowering solenoid 286 and a hopper feed solenoid 300 (FIG. 1). The solenoid 300 opens a gate 302 (FIG. 1) which allows a predetermined quantity of molding powder to fall from the hopper. Thus when the solenoids 288, 300 are activated, the funnel assembly 256 tilts from the disengaged position (dotted outline in FIG. 3) into the engaged position (solid outline in FIG. 3), and at the same time the charge falls from the hopper gate into the funnel 273 (FIG. 3). The timing of these operations is such that the powder charge falls from the funnel 273 (FIG. 3) when the funnel outlet is just above the lower mold locating tube 157 (FIG. 3). As this first part of the powder feed sequence is completed, the station inner mold 52 (FIG. 3) meets the funnel assembly shoulder 284 in the first position and begins to push the funnel assembly along the shafts 268 and 272 in the second position. Next, the switch 292 is deactivated as the station passes it, and then the station 26 (FIG. 3) meets the second trip switch 294 (FIG. 9) which activates the funnel raising solenoid 288 and the funnel assembly returns to its disengaged FIG. 3 position whereupon the return spring 282 (FIG. 9) moves the funnel assembly 256 back to its first position ready to feed the next station.

The foregoing description has not included a description of any particular mold 32 (FIG. 1) because the machine is suitable for molding articles of solid material, or for encapsulating a variety of parts. However the machine is particularly suitable for encapsulating small electrical components. Reference is now made to FIG. 10 which illustrates a preferred mold suitable for encapsulating small electrical components 228 which have a cylindrical body 302 and axial inlet and outlet wires 304 and 306 respectively. The inner mold part 52 comprises a generally rectangular main body portion 308 having a centrally disposed outwardly extending projection 310 running longitudinally (relative to the FIG. 1 machine). The projection has generally parallel longitudinal sidewalls 312 and raised molding portion 314 on its outer face. The longitudinal sides of the molding portion 314 taper to form undercuts 316. The central area 317 of the portion 314 is shaped to receive two components 228 in transversely extending recesses 318 which are linked by a longitudinal runner recess 320 for allowing molding liquid to run from the inner locating tube 157 (FIG. 3) into the recesses 318. The central area 317 is bounded transversely by curved recesses 322 (one of which is fully shown) for receiving a stretched resilient sealing ring 324 which is held in place about the central area 317 by sections of the molding portion undercuts 316. (The function of the sealing ring 325 will be described later). Each longitudinal sidewall 312 has an associated locating member 326 attached by screws 328 (one of which is shown) for guiding the outer mold half 50 onto dissimilar mold locating pins 330 and 332 set in the outer face of the raised portion 314. Each of the locating members 326 also includes a longitudinal lip 334 which is in contact with the outer face of the projection 310 and which terminates in an undercut face 336 for holding the resilient sealing ring 324 in place about the central molding area 317. The sidewall locating members 326 also include longitudinally spaced V-notches 338 disposed on the centerline of the molding apertures 318 for guiding the parts 228 from a pair of parts feeder fingers 340 which move from the position shown into the chain-dotted position to leave the parts in the mold recesses 318.

The mold outer half 50 is similar to the mold inner half 52. The outer half includes a pair of unequal recesses 342 and 344 for receiving the inner mold half pins 330 and 332 respectively to locate the mold halves about the components 228. The outer half 50 also includes the vacuum valve 214, (FIG. 3), the mushroom head 218 of which is shown.

One of the features of the mold 32 is that the resilient seals 324 and 325 (in the mold half 50) give a good seal about the component wires 304 and 306 thereby eliminating the need to provide individual seals about each wire. Also when the mold is opened the natural resiliency of the seal 324 tends to lift the molded product 233 to thereby free the product off the mold preparatory to removing the product from the mold.

Reference is next made to FIGS. 7 and 11 which show the finished product 233. The product consists of two components 228 encapsulated in a molded film and joined to a central plug 346 by a thin wall or cull 348. The plug 346 is formed in the mold inner half locating sleeve 157 (FIG. 3) and has a recess 350 corresponding to the outer mold vacuum valve mushroom head 218 (FIG. 9) which recess helps to reduce the volume of wasted molding material.

We claim:

1. A machine for molding small articles from plastic or the like, said machine comprising:
    a. a support structure;
    b. a wheel mounted on said support structure for rotation about a longitudinal axis, said longitudinal axis being normal to a plane containing said wheel;
    c. drive means operatively connected to said wheel for rotating said wheel about said longitudinal axis through a molding cycle;
    d. at least one mold comprising a pair of mold members, said mold members being adapted to be brought together to define a mold cavity;
    e. station means connecting said mold to said wheel adjacent the periphery of said wheel for movement of at least one of said mold members towards and away from the other of said mold members between an open position for receiving a charge of molding material and for allowing the removal of finished molded parts, and a closed position for forming and curing said molded parts;
    f. mold cam means fixed to said support structure, said mold cam means having a cam profile to provide radial camming forces at predetermined intervals in said molding cycle; and
    g. mold cam follower means operatively engaged with said mold and with said mold cam means, said follower means being responsive to said camming forces to move said mold between said open and closed positions as said wheel rotates through said molding cycle.

2. A machine as claimed in claim 1 which further includes molding material feeder means coupled to said support structure for placing a charge of molding material in said mold when said mold is in said open position.

3. A machine as claimed in claim 1 which further includes mold heating means, said mold heating means comprising:
    i. oil heating means;
    ii. at least one oil platen coupled to said station means in contact with said mold;
    iii. oil distribution means coupled to said machine for feeding hot oil from said oil heating means to said oil platen, and for returning cooled oil to said heating means.

4. A machine as claimed in claim 3 wherein said platen comprises: a stainless steel body portion having an oil chamber; and a cover formed from a laminate of copper and silver for sealing said oil chamber, said copper being in contact with said mold for improved heat transfer.

5. A machine as claimed in claim 1, which further includes injector means for injecting a charge of molding material into said mold cavity when said mold is in said closed position, said injector comprising:
    i. a tube attached to said mold, said tube having an aperture which opens into said mold cavity;
    ii. an injector piston slidably engaged in said tube, said injector piston being movable from a withdrawn charge-receiving position to an injection position for injecting said charge into said mold;
    iii. injector cam means attached to said support means, said injector cam means having a cam profile to provide a radial camming force;
    iv. radial injector cam follower means operatively engaged with said injector piston and responsive to said injector cam camming force to move said piston between said charge-receiving and said injection positions to inject said charge into said mold cavity.

6. A machine as claimed in claim 1 which further includes injector means for injecting a charge of molding material into said mold cavity when said mold is in said closed position, said injector means comprising:
    i. a tube attached to said mold, said tube having an aperture which opens into said mold cavity;
    ii. an injector piston slidably engaged in said tube, said injector piston being movable from a withdrawn charge-receiving position to an intermediate injection position for injecting said charge into said mold cavity, and then to a final ejection position for ejecting a finished molded article from said mold cavity;
    iii. injector cam means attached to said support means, said injector cam means having a cam profile to provide a radial camming force;
    iv. radial injector cam follower means operatively engaged with said injector piston and responsive to said injector cam camming force to move said piston, said cam follower means comprising: a cam follower bracket; and a spring which is compressed between said piston and said cam follower bracket, said piston being moved by said injector cam follower means between said withdrawn charge-receiving position and said injection position, thereby further compressing said spring such that as said mold opens, said spring moves said piston to said ejection position to lift said molded article off a said mold member.

7. A machine as claimed in claim 5 which further includes a vacuum system, said vacuum system comprising:
    i. a vacuum source;
    ii. vacuum valve means coupled to said mold and adapted to open to draw air from said mold cavity;
    iii. means operable to open said vacuum valve at predetermined intervals related to injection of said charge into said mold cavity for opening said valve to withdraw said air and for closing said valve before injection is complete;
    iv. vacuum distribution means coupled to said vacuum source and to said valve means for distributing said vacuum to said valve means.

8. A machine as claimed in claim 1 which further comprises parts feeder means for automatically placing at least one part in said mold cavity for encapsulation of said part, said parts feeder means being rotatably connected to said support structure for rotation of said parts feeder means about said longitudinal axis such that said parts feeder means moves with said wheel as said part is placed in said mold cavity.

9. A machine as claimed in claim 8 wherein said parts feeder means comprises:
  i. a radially extending support arm, said support arm being rotatably mounted at a first end about said longitudinal axis for rotation between a rest position and a displaced position;
  ii. a parts feeder head rigidly attached to the distal end of said arm;
  iii. spring means operatively connected to said support for biassing said arm toward said rest position;
  iv. stop means attached to said parts feeder head for releasably engaging said moving station means, said stop means being movable between an engagement position for contacting a said station means and a release position, said support arm being moved from said rest position to said displaced position by a said station means with said stop means in said engagement position;
  v. feeder fingers coupled to said parts feeder head for feeding said parts into said mold as said support arm is moved by said station means from said rest position to said displaced position; and
  vi. support arm control means for moving said stop means into said release position as said support arm reaches said displaced position, whereupon said spring means returns said support arm to said rest position.

10. A machine as claimed in claim 1 wherein said machine further comprises molding material feeder means comprising: a hopper for containing molding material; means coupled to said hopper for measuring a predetermined charge of molding material; a funnel assembly for guiding said charge from said measuring means into said mold; means supporting said funnel assembly for movement between a first position and a second position along a path generally parallel to a portion of the path followed by said station means; means coupling said funnel support means to said support structure for movement of said support means and said funnel assembly between a disengagement position in which said funnel assembly is remote from said mold and a mold-charging position in which said funnel assembly is in place to guide said charge from said measuring means into said mold; first control means for moving said funnel assembly from said disengagement position into said mold-charging position, as said mold meets said funnel assembly in said first position, and for subsequently actuating release of said predetermined charge from said hopper measuring means with said funnel assembly in said mold-charging position, said funnel assembly being moved from said first position to said second position as said wheel rotates; second control means for moving said funnel assembly from said mold-charging position into said disengagement position, said second control means being actuated as said funnel assembly moves into said second position; and return means for moving said funnel assembly from said second position to said first position with said funnel assembly in said disengagement position.

11. A machine as claimed in claim 1 wherein said machine further comprises molding material feeder means, said feeder means comprising:
  i. a hopper attached to said support means for containing molding material, said hopper having a bottom gate for measuring a predetermined charge of said molding material;
  ii. gate release means operatively connected to said gate for releasing said predetermined charge of molding material;
  iii. a framework rigidly coupled to said support means;
  iv. track means, and means connecting said track means to said framework in an orientation generally parallel to a portion of the path followed by said station means;
  v. funnel assembly having a funnel, said funnel having an upper end for receiving said charge of molding material from said hopper and a lower end for delivering said charge of molding material into said mold, said funnel assembly being slidable on said track means between a first position and a second position, said track means being restrained to rotate between a mold-charging position in which said funnel is in place to guide said charge from said gate into said mold and a disengagement position in which said funnel is remote from said mold, said funnel assembly being adapted to engage said station means when said funnel assembly is in said mold-charging position to move said funnel assembly from said first position to said second position while said lower end of said funnel guides said charge of molding material into said mold;
  vi. spring return means attached to said framework for biassing said funnel assembly towards said first position;
  vii. first control means attached to said framework, said control means comprising: a first solenoid for rotating said track means to place said funnel assembly into said engagement position; a switch adapted to be closed by said station means as said station approaches said powder feed means to activate said gate release means and said first solenoid to thereby move said funnel assembly into said engagement position where said funnel guides said charge of molding material into said mold as said funnel assembly is moved along said track by said station means towards said second position;
  viii. second control means attached to said framework, said second control means comprising: a second solenoid for rotating said track means to place said funnel assembly into said disengagement position; and a switch adapted to be closed by said station as said station passes said powder feeder means to activate said second solenoid, thereby rotating said track means to place said funnel assembly in said disengagement position whereupon said spring means returns said funnel assembly means along said track means to said first position.

12. A machine as claimed in claim 1 which further comprises, parts stripper means for removing said molded articles from said mold when said mold is in said open position, said parts stripper means being coupled to said support structure for rotation of said parts stripper means about said longitudinal axis such that said parts stripper means moves with said wheel as said parts are removed from said mold.

13. A machine as claimed in claim 12 wherein said parts stripper means comprises:
  i. a radially extending support arm, said support arm being rotatably mounted at a first end about said longitudinal axis for rotation between a rest position and a displaced position;
  ii. a parts stripper head rigidly attached to the distal end of said arm;
  iii. spring means operatively connected to said support arm for biassing said arm towards said rest position;
  iv. stop means attached to parts stripper head for releasably engaging said moving station means, said stop means being movable between an engagement position for contacting a said station means and a release position, said support arm being moved from said rest position to said displaced position by a said station means with said stop means in said engagement position;
  v. stripper fingers coupled to said parts stripper head for stripping said molded articles from said mold as said support arm is moved by said station means from said rest position to said displaced position; and
  vi. support arm control means for moving said stop means into said release position as said support arm reaches said displaced position, whereupon said spring means returns said support arm to said rest position.

14. A machine as claimed in claim 5 wherein said mold cam follower means comprises: a radial guide tube slidably mounted in said station means, and a roller rotatably attached to the inner end of said guide tube, said roller being adapted to follow said mold cam profile and said
  guide tube being attached at its outer end to a said mold member; and wherein said injector cam follower means is slidably engaged inside said guide tube, and includes a roller at the inner end of said injector cam follower means for following said injector cam profile.

15. A machine as claimed in claim 11 wherein said material is a finely powdered thermosetting plastic.

16. A machine as claimed in claim 1 which further includes latch means mounted on said station means for locking said mold cam follower means with said mold in said closed position, and wherein said mold cam profile is shaped such that said cam follower means is clear of said cam means for a portion of said cycle to thereby remove stress from said mold cam means and from said wheel, and wherein said machine further includes means for unlocking said latch at a predetermined point in said cycle.

17. A machine as claimed in claim 14 which further includes latch means mounted on said station means for cooperating with said radial guide tube to lock said mold cam follower means with said mold in said closed position, and wherein said mold cam profile is shaped such that said cam follower means is clear of said cam means for a portion of said cycle to thereby remove stress from said mold cam means and from said wheel, and wherein said machine further includes means for unlocking said latch at a predetermined point in said cycle.

18. A machine as claimed in claim 1 wherein said plane containing said wheel is vertical.

19. A machine as claimed in claim 5 which further includes latch means mounted on said station means for locking said mold cam follower means with said mold in said closed position, and wherein said mold cam profile is shaped such that said cam follower means is clear of said cam means for a portion of said cycle to thereby remove stress from said mold cam means and from said wheel, and wherein said machine further includes means for unlocking said latch at a predetermined point in said cycle.

* * * * *

UNITED STATES PATENT OFFICE
CERTIFICATE OF CORRECTION

Patent No. 3,635,612                    Dated January 18, 1972

Inventor(s) Michael J. Fortin et al

It is certified that error appears in the above-identified patent and that said Letters Patent are hereby corrected as shown below:

On the cover sheet [30], under the heading "Foreign Application Priority Data", "Canada" should read -- Great Britain --.

Signed and sealed this 7th day of November 1972.

(SEAL)
Attest:

EDWARD M. FLETCHER, JR.                 ROBERT GOTTSCHALK
Attesting Officer                       Commissioner of Patents